United States Patent
Apkarian

(10) Patent No.: US 9,796,482 B2
(45) Date of Patent: Oct. 24, 2017

(54) AERIAL SENSOR SYSTEM AND MOUNTING ASSEMBLY THEREFOR

(71) Applicant: Coriolis Games Corporation, Toronto (CA)

(72) Inventor: Jacob Apkarian, Toronto (CA)

(73) Assignee: Coriolis Games Corporation, Toronto (CA)

( * ) Notice: Subject to any disclaimer, the term of this patent is extended or adjusted under 35 U.S.C. 154(b) by 0 days.

(21) Appl. No.: 15/349,453

(22) Filed: Nov. 11, 2016

(65) Prior Publication Data

US 2017/0166326 A1    Jun. 15, 2017

Related U.S. Application Data

(60) Provisional application No. 62/266,156, filed on Dec. 11, 2015.

(51) Int. Cl.
 *B64D 47/08*  (2006.01)
 *G03B 15/00*  (2006.01)
 *G03B 17/56*  (2006.01)

(52) U.S. Cl.
 CPC ............ *B64D 47/08* (2013.01); *G03B 15/006* (2013.01); *G03B 17/561* (2013.01)

(58) Field of Classification Search
 CPC .............................. G03B 15/006; B64D 47/08
 See application file for complete search history.

(56) References Cited

U.S. PATENT DOCUMENTS

| | | | | |
|---|---|---|---|---|
| 3,727,532 A | * | 4/1973 | Gregory | G03B 17/561 348/121 |
| 4,490,724 A | | 12/1984 | Bickman | |
| 6,370,329 B1 | * | 4/2002 | Teuchert | G02B 27/644 359/556 |
| 8,794,566 B2 | | 8/2014 | Hutson | |
| 2008/0073989 A1 | | 3/2008 | Bandera | |
| 2008/0210025 A1 | * | 9/2008 | Goossen | F16M 11/041 74/5.34 |
| 2014/0034776 A1 | * | 2/2014 | Hutson | B64D 45/00 244/17.17 |
| 2017/0050726 A1 | * | 2/2017 | Yamada | B64C 27/08 |
| 2017/0089513 A1 | * | 3/2017 | Pan | F16M 13/022 |

FOREIGN PATENT DOCUMENTS

| | | |
|---|---|---|
| CN | 204415742 U | 6/2015 |
| CN | 204650290 U | 9/2015 |
| EP | 2813428 A1 | 12/2014 |
| KR | 10-2012-0082728 A | 7/2012 |

OTHER PUBLICATIONS

Mizutani et al. "Proposal and Experimental Validation of a Design Strategy for a UAV with a Passive Rotating Spherical Shell." 2015 IEEE/RSJ International Conference on Intelligent Robots and Systems (IROS). 978-1-4799-9993-4, pp. 1271-1278. Hamburg, Germany. Sep. 28-Oct. 2, 2015.

* cited by examiner

*Primary Examiner* — W B Perkey
(74) *Attorney, Agent, or Firm* — Bereskin & Parr LLP/S.E.N.C.R.L., s.r.l.

(57) ABSTRACT

An aerial sensor system is disclosed. The system includes an aerial vehicle, a camera, and a sensor mounting assembly coupled to the aerial vehicle and to the camera. The sensor mounting assembly permits the camera to be positioned radially outwardly from the aerial vehicle in all spherical positions.

16 Claims, 18 Drawing Sheets

AERIAL SENSOR SYSTEM AND MOUNTING ASSEMBLY THEREFOR

FIELD

This disclosure relates to the field of aerial sensor systems, and to mounting assemblies for aerial vehicles.

INTRODUCTION

An aerial vehicle, such as a rotary aircraft (e.g. a helicopter or a multicopter), may be equipped with one or more sensors. This may permit the sensor(s) to collect readings or data at elevations achievable by the aerial vehicle.

SUMMARY

In one aspect, an aerial sensor system is provided. The system may include an aerial vehicle, a camera, and a sensor mounting assembly coupled to the aerial vehicle and to the camera. The sensor mounting assembly may permit the camera to be positioned radially outwardly from the aerial vehicle in all spherical positions.

In another aspect, an aerial sensor system is provided. The system may include an aerial vehicle, a first, a camera, and one or more motors. The first arm may be rotatably coupled to the aerial vehicle. The first arm may be rotatable around the aerial vehicle about a first axis. The camera may be movably coupled to the first arm. The camera may be movable relative to the first arm around the aerial vehicle. The one or more motors may be collectively coupled to the first arm and the sensor. The one or more motors may be collectively operable to selectively position the camera around the aerial vehicle.

DRAWINGS

DESCRIPTION OF VARIOUS EMBODIMENTS

Figure 1:
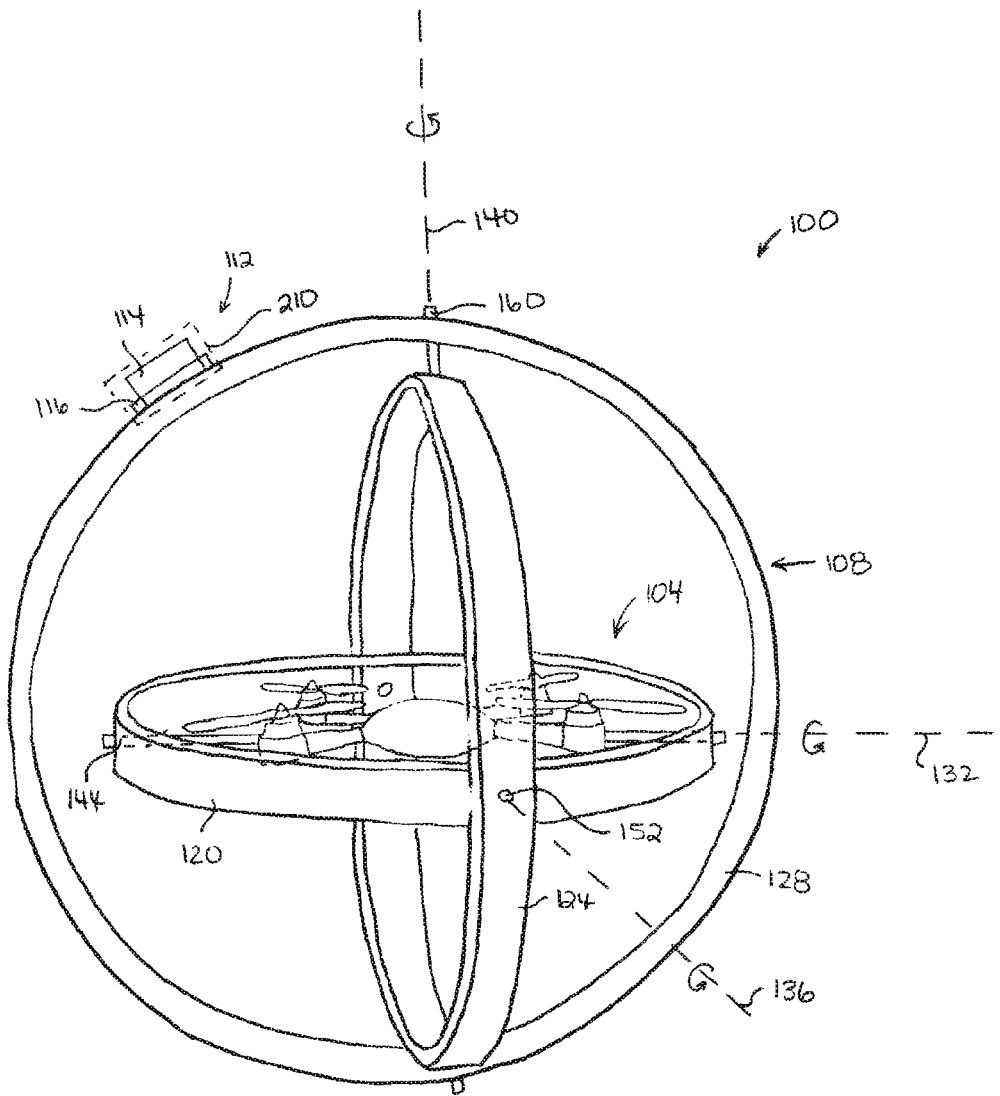
FIG. 1 is a perspective view of an aerial sensor system, in accordance with at least one embodiment.
Figure 2A:
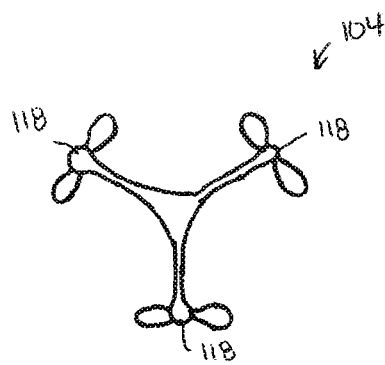
FIGS. 2A-2F are top plan views of multicopters, in accordance with at least one embodiment.
Figure 2B:
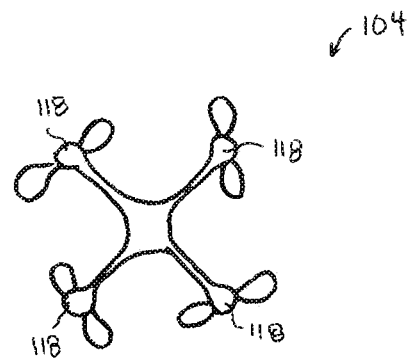
Figure 2C:
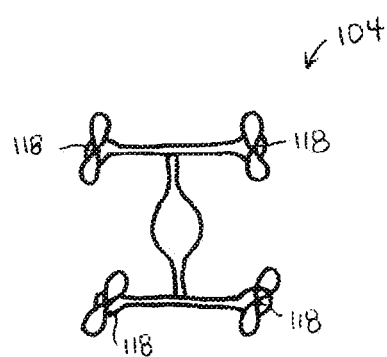
Figure 2D:
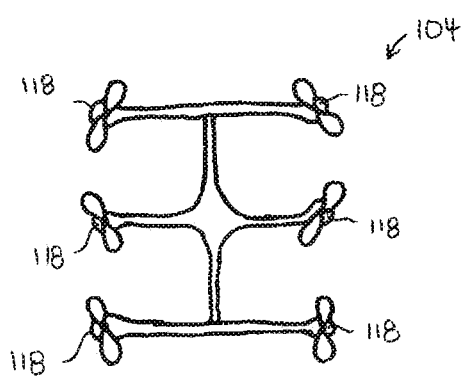
Figure 2E:
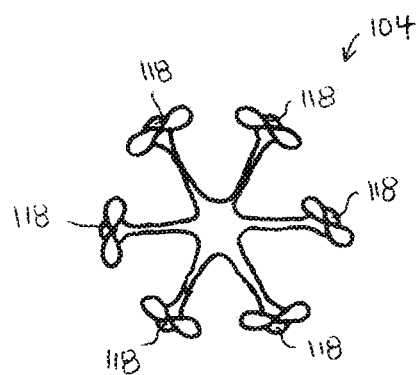
Figure 2F:
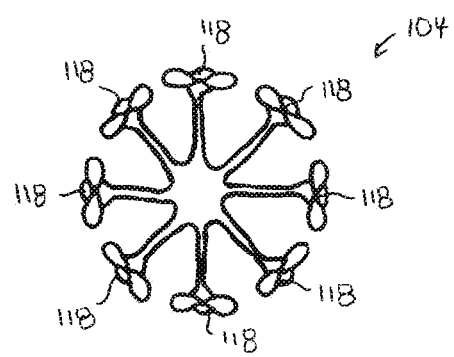

Numerous embodiments are described in this application, and are presented for illustrative purposes only. The described embodiments are not intended to be limiting in any sense. The invention is widely applicable to numerous embodiments, as is readily apparent from the disclosure herein. Those skilled in the art will recognize that the present invention may be practiced with modification and alteration without departing from the teachings disclosed herein. Although particular features of the present invention may be described with reference to one or more particular embodiments or figures, it should be understood that such features are not limited to usage in the one or more particular embodiments or figures with reference to which they are described.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

As used herein and in the claims, two or more parts are said to be "mounted", "coupled", "connected", "attached", or "fastened" where the parts are joined or operate together either directly or indirectly (i.e., through one or more intermediate parts), so long as a link occurs. As used herein and in the claims, two or more parts are said to be "directly mounted", "directly coupled", "directly connected", "directly attached", or "directly fastened" where the parts are connected in physical contact with each other. As used herein, two or more parts are said to be "rigidly mounted", "rigidly coupled", "rigidly connected", "rigidly attached", or "rigidly fastened" where the parts are coupled so as to move as one while maintaining a constant orientation relative to each other. None of the terms "mounted", "coupled", "connected", "attached", and "fastened" distinguish the manner in which two or more parts are joined together.

Typically, a camera mounted to an aerial vehicle is mounted to a fixed location on or relative to the aerial vehicle. For example, in a multicopter, the camera may be suspended below the body (e.g. between the landing gear). This may permit the camera to take aerial photographs, panoramas, videos, etc. of the view below. In some cases, the camera may be mounted to a mount (e.g. gimbal) that allows rotation of the camera about one or more axes. This may permit the direction of the camera to be adjusted. However, such mounts may not permit the camera to rotate to face all spherical directions (e.g. 360 degree rotation in all directions). Also, due to the fixed location of the mounted camera relative to the aerial vehicle, the aerial vehicle may obstruct the view of the camera in some directions. For example, the aerial vehicle may obstruct upward views of a camera mounted below the aerial vehicle.

Embodiments of an aerial sensor system described herein include an aerial vehicle equipped with a sensor mounting system that permits an attached sensor to move around the aerial vehicle. This may permit the sensor to be repositioned around the aerial vehicle to make available additional unobstructed sightlines.

FIG. 1 shows an aerial sensor system 100 including an aerial vehicle 104, and a sensor mounting assembly 108. As shown, a sensor assembly 112 may be movably (e.g. rotatably) mounted to aerial vehicle 104 by way of sensor mounting assembly 108, whereby the sensor assembly 112 may be repositioned around the aerial vehicle 104. Sensor assembly 112 comprises a sensor 114 and a sensor mount 116. Sensor 114 may be any electronic device that takes readings or measurements, such as for example a camera (e.g. still camera, video camera, infrared camera, or hyperspectral camera), sonar device, radar device, microphone, range finder, or actinometer. Sensor 114 may be a discrete component that is removably or permanently connected to sensor mount 116, or sensor 114 and sensor mount 116 may be integrally formed.

Aerial vehicle 104 may be any airborne vehicle suitable for carrying sensor mounting assembly 108 and a mounted sensor assembly 112. For example, aerial vehicle 104 may be a rotory aircraft, such as a multicopter as shown. A multicopter is an aerial vehicle that includes a plurality of rotors which provide thrust for lift and horizontal movement. Steering and control may be provided by modulating the relative magnitude of thrust from each rotor so that the aerial vehicle will pitch, roll, or yaw as desired. Multicopter based aerial vehicles may permit vertical takeoff and landings. As shown, aerial vehicle 104 may be wingless (i.e. have no surfaces shaped to develop substantial lift in response to forward movement).

Multicopter 104 may have any number of rotors. Further, the rotors may have any arrangement suitable for providing lift and navigation. In various embodiments, multicopter 104 may have at least 3 rotors 118. For example, FIGS. 2A-2F illustrate a variety of different examples of multicopter 104, which including between 3 and 8 multicopter rotors 118 in different arrangements.

Returning to FIG. 1, sensor mounting assembly 108 may include one or more arms rotatably coupled to aerial vehicle 104 to permit a mounted sensor assembly 112 to rotate around aerial vehicle 104. In the illustrated embodiment, sensor mounting assembly 108 includes a first arm 120, a second arm 124, and a third arm 128. As shown, first arm 120 may be rotatably coupled to aerial vehicle 104, second arm 124 may be rotatably coupled to first arm 120, and third arm 128 may be rotatably coupled to second arm 124. First arm 120 may be rotatable around aerial vehicle 104 about a first axis 132, second arm 124 may be rotatable around aerial vehicle 104 about a second axis 136, third arm 128 may be rotatable around aerial vehicle 104 about a third axis 140, and sensor assembly 112 may be mounted to third arm 128. This may provide sensor assembly 112 with a plurality of degrees of movement around aerial vehicle 104.

Figure 3:
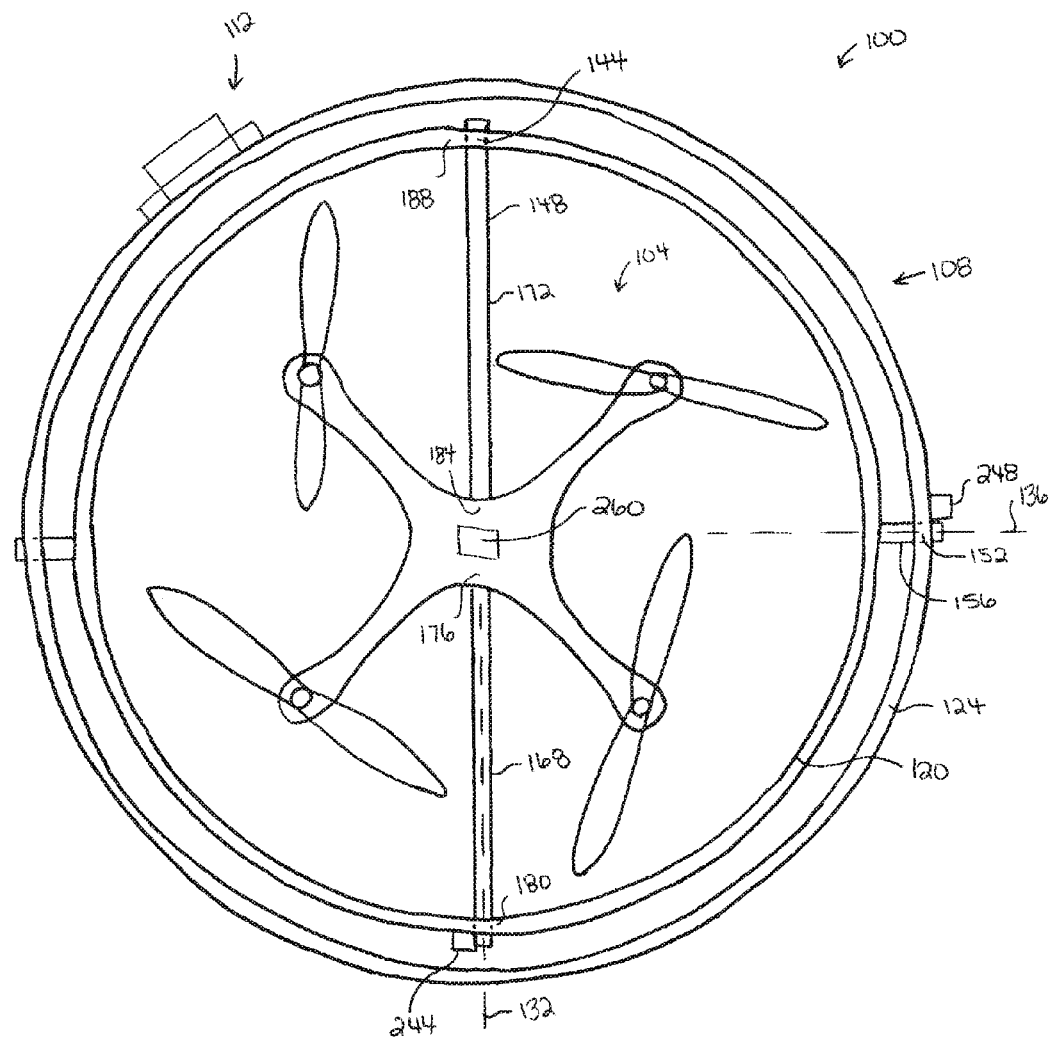
FIG. 3 is a top plan view of an aerial sensor system, in accordance with at least one embodiment.

Sensor mounting assembly 108 may include any suitable number of arms. For example, sensor mounting assembly 108 may include 1, 2, or more than 3 arms. FIG. 3 shows an example embodiment including exactly two arms 120 and 124, and FIG. 4 shows an example embodiment including exactly one arm 120.

Figure 4:
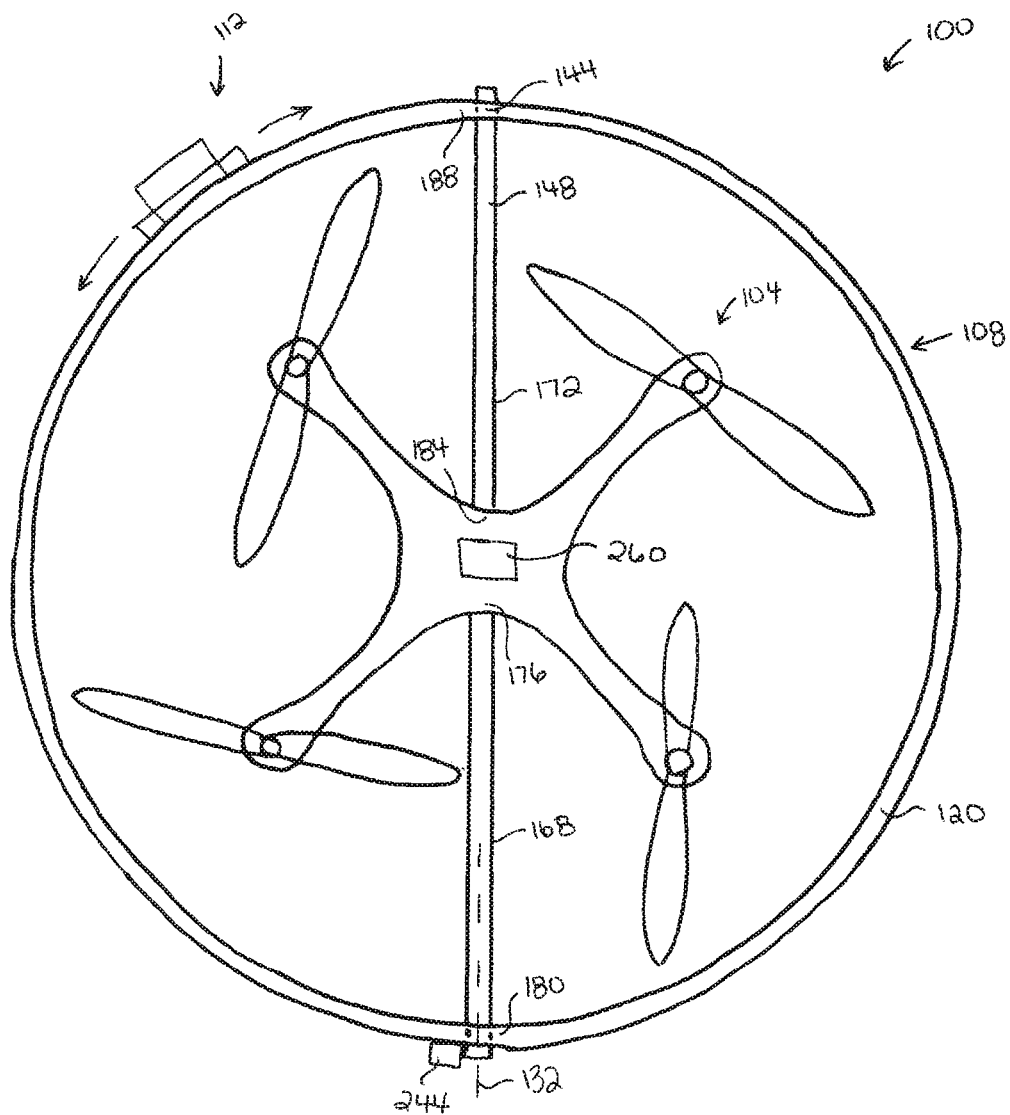
FIG. 4 is a top plan view of an aerial sensor system, in accordance with at least one embodiment.
Figure 5:
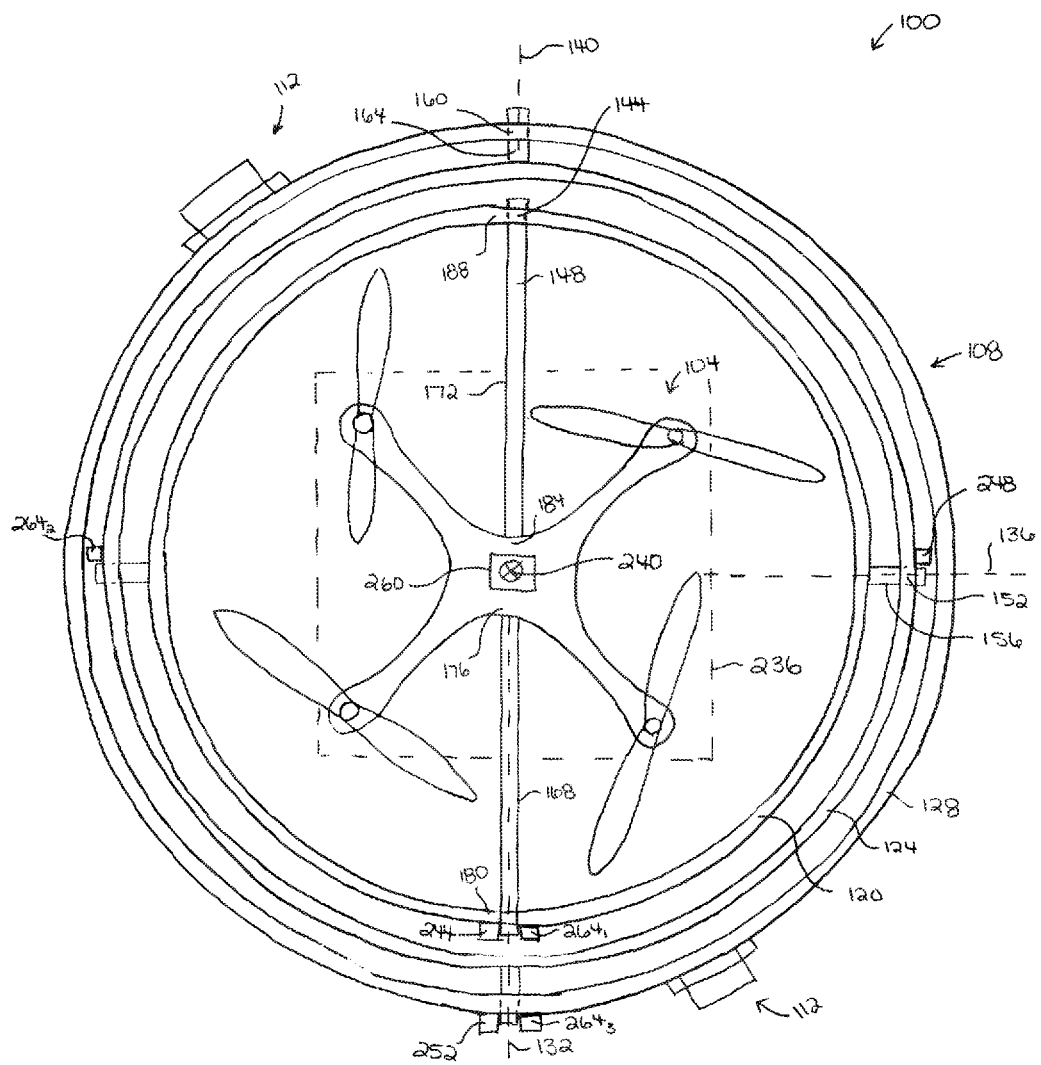
FIG. 5 is a top plan view of an aerial sensor system, in accordance with at least one embodiment.
Figure 6:
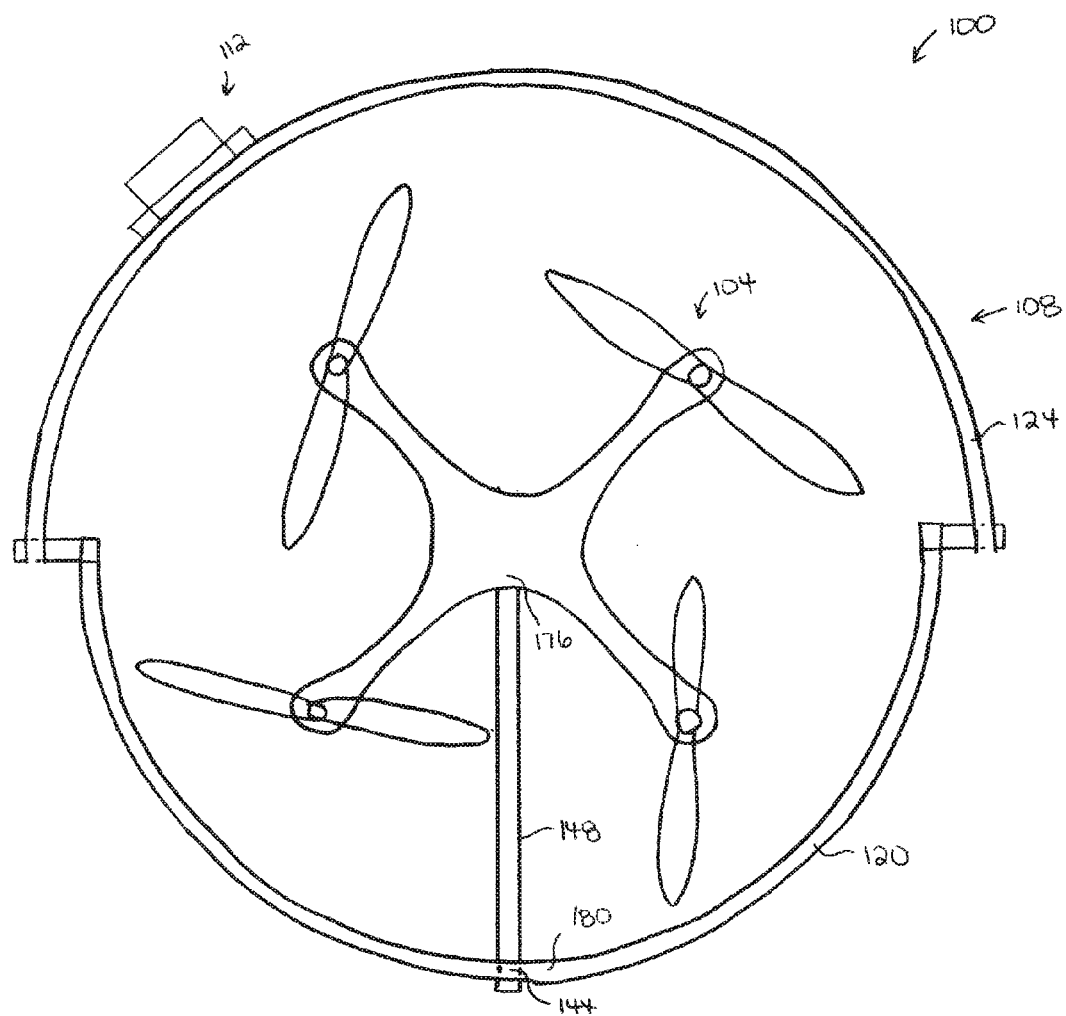
FIG. 6 is a top plan view of an aerial sensor system, in accordance with at least one embodiment.
Figure 7:
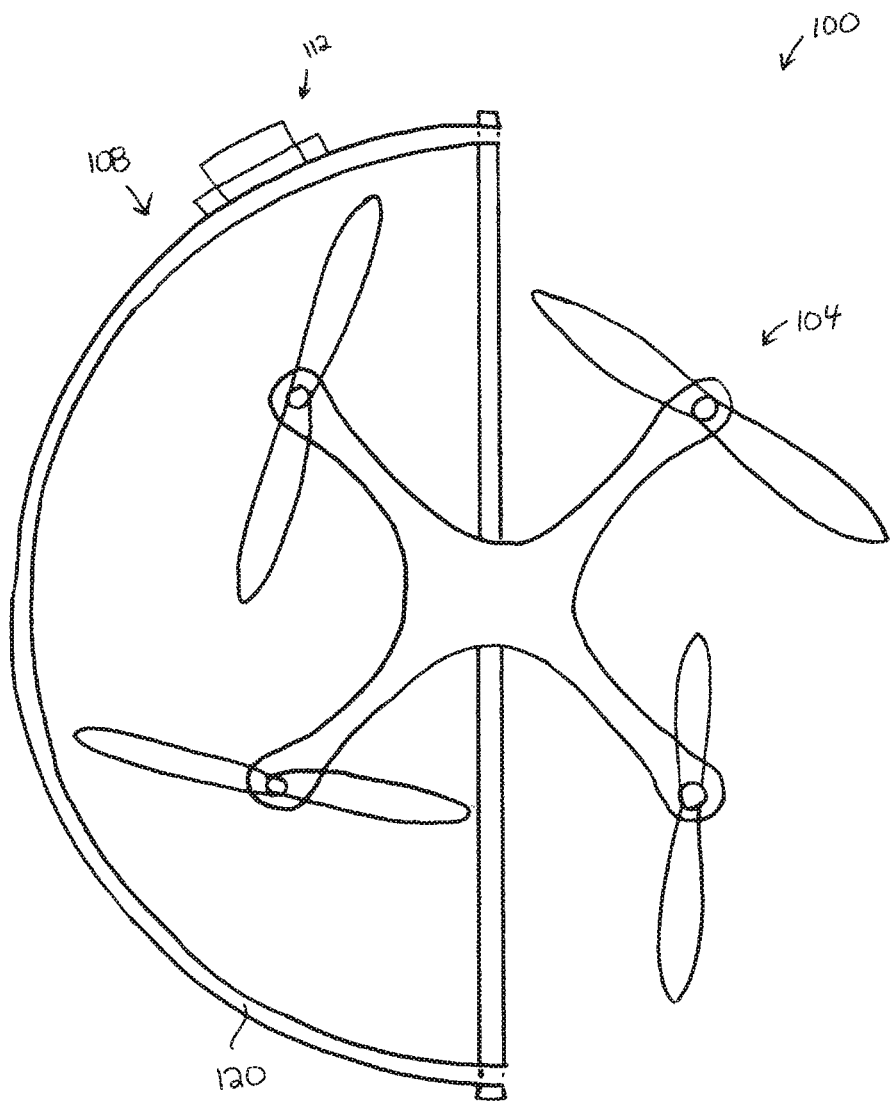
FIG. 7 is a top plan view of an aerial sensor system, in accordance with at least one embodiment.

Referring to FIGS. 3-5, aerial vehicle 104 may be at least partially nested in each arm 120, 124, and/or 128 of the sensor mounting assembly 108. As shown, each arm 120, 124, and/or 128 may be sized and shaped to at least partially surround aerial vehicle 104. This may permit each arm 120, 124, and/or 128 to rotate around aerial vehicle 104. In the illustrated embodiment, each arm 120, 124, and/or 128 completely surrounds aerial vehicle 104. FIGS. 6 and 7 show examples of sensor mounting assembly 108 where aerial vehicle 104 is partially nested in each arm 120 and/or 124. As shown, each arm 120 and/or 124 partially surrounds aerial vehicle 104. In alternative embodiment, at least one arm 120, 124, or 128 may complete surround aerial vehicle 104 and at least one arm 120, 124, or 128 may partially surround aerial vehicle 104. For example, in a variation of sensor mounting assembly 108 of FIG. 6, first arm 120 may completely surround aerial vehicle 104, and second arm 124 may partially surround aerial vehicle 104.

Returning to FIG. 5, each arm 120, 124, and 128 may be rotatably coupled in fashion suitable for allowing each arm 120, 124, and 128 to rotate around aerial vehicle 104. For example, rotary joints of any kind suitable for this purpose may form the rotatable couplings of sensor mounting assembly 108. In the illustrated example, first arm 120 is rotatably coupled to aerial vehicle 104 by a first rotary joint 144. As shown, first rotary joint 144 may include a first axle 148 connecting aerial vehicle 104 to first arm 120. Axle 148 may define first axis 132. For example, axle 148 may be collinear with first axis 132. First arm 120 may be rotatable around first axis 132 relative to first axle 148, or first axle 132 may be rotatable around first axis 132 relative to aerial vehicle 104, or both. Optionally, sensor mounting assembly 108 may include any suitable bearings for the rotation of first arm 120 around aerial vehicle 104 about first axis 132.

Similarly, second arm 124 may be rotatably coupled to first arm 120 by a second rotary joint 152 which may include a second axle 156, and third arm 128 may be rotatably coupled to second arm 124 by a third rotary joint 160 which may include a third axle 164. Second and third axles 156 and 164 may define second and third axes 136 and 140 respectively. For example, second and third axles 156 and 164 may be collinear with second and third axes 136 and 140 respectively. Optionally, sensor mounting assembly 108 may include any suitable bearings for the rotation of second and third arms 124 and 128 around aerial vehicle 104 about second and third axes 136 and 140.

Referring to FIGS. 3-5, each rotary joint 144, 152, and 160 may form any suitable number of connections between the parts joined by the joint. In the illustrated embodiment, each rotary joint 144, 152, and 160 provides two connections, 180 degrees apart. As shown, each axle 148, 156, and 160 may include a first portion connecting the first end of each part, and a second portion connecting a second end of each part. The second ends may be opposite the first ends. For example, axle 148 includes a first axle portion 168 and a second axle portion 172. First axle portion 168 may join a first aerial vehicle end 176 to first arm end 180, and second axle portion 172 may join second aerial vehicle end 184 to second arm end 188. First ends 176 and 180 may be opposite second ends 184 and 188. In alternative embodiments, one or more (or all) of rotary joints 144, 152, and 160 may each form just one connection between the parts joined by the joint. For example, FIG. 6 shows an embodiment where first rotary joint 144 includes an axle 148 that connects only first aerial vehicle end 176 to first arm end 180.

Referring to FIGS. 3-5, first, second, and third arms 120, 124, and 128 may be rotatably coupled in series, with the sensor assembly 112 mounted to the outermost arm 120, 124, or 128. This may provide the sensor assembly 112 with one or more degrees of freedom to move around aerial vehicle 104. For example, FIGS. 1 and 5 show an embodiment with three arms 120, 124, and 128 rotatably connected in series, and sensor assembly 112 connected to the third arm 128. In the illustrated embodiment, first arm 120 can rotate around aerial vehicle 104 about first axis 132, and therefore can rotate around aerial vehicle 104 with one degree of freedom. Second arm 124 can rotate around aerial vehicle 104 about first and second axes 132 and 136, and therefore can rotate around aerial vehicle 104 with two degrees of freedom. Third arm 128 can rotate around aerial vehicle 104 about first, second, and third axes 132, 136, and 140, and therefore can rotate around aerial vehicle 104 with three degrees of freedom. Thus, sensor assembly 112, which is connected to third arm 128, is also movable around the aerial vehicle 104 with at least the three degrees of freedom enjoyed by third arm 128. FIG. 3 shows an embodiment where sensor assembly 112, which is connected to second arm 124, is movable around aerial vehicle 104 with at least the two degrees of freedom enjoyed by second arm 124. FIG. 4 shows an embodiment where sensor assembly 112, which is connected to first arm 120, is movable around aerial vehicle 104 with at least the one degree of freedom enjoyed by first arm 120.

Figure 8:
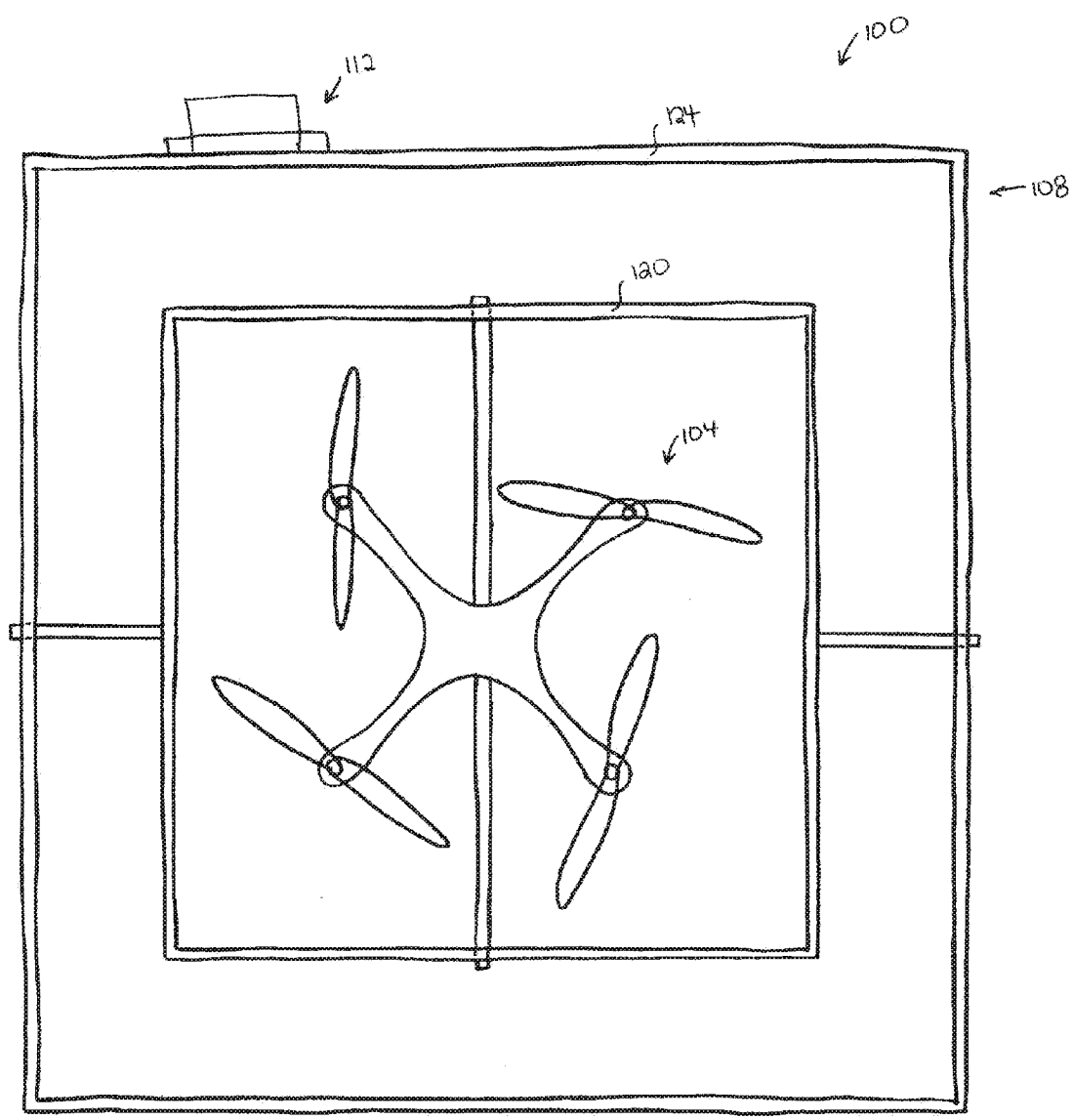
FIG. 8 is a top plan view of an aerial sensor system, in accordance with at least one embodiment.

Referring to FIGS. 3-5, arms 120, 124, and 128 may have any shape suitable for moving around aerial vehicle 104. In some embodiments, arms 120, 124, and 128 may have a regular shape (e.g. circular, square, hexagonal, etc.) or an irregular shape. In the illustrated embodiment, each arm 120, 124, and 128 is circular. FIG. 8 shows an alternative embodiment including arms 120 and 124 having square shapes. Further, each arm 120, 124, and 128 may form a closed shape as shown in FIGS. 3-5, or one or more arms may form an open shape (e.g. semi-circle) as shown in FIGS. 6 and 7. The closed arms of FIGS. 3-5 may provide a more balanced mass about the aerial vehicle, which may be desired in some embodiments.

Figure 9:
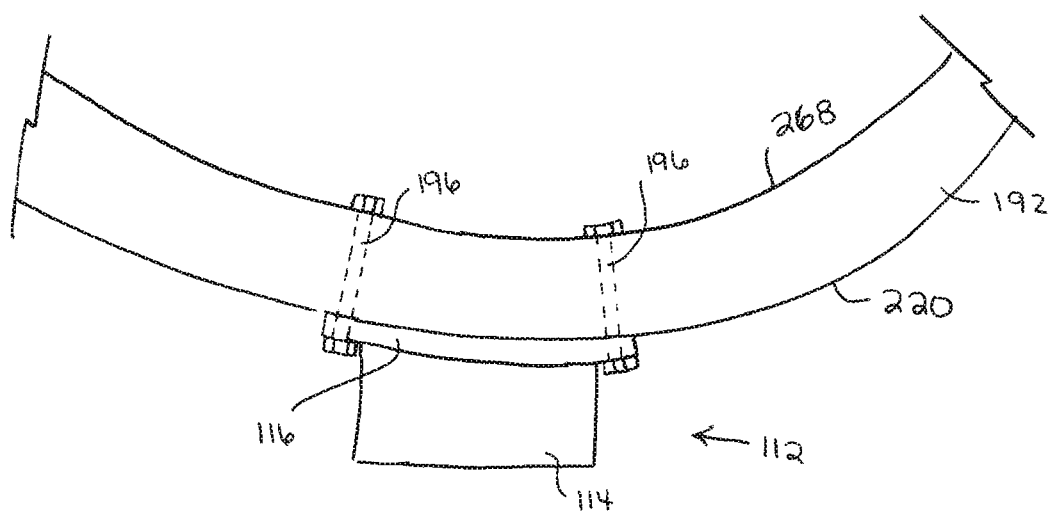
FIG. 9 is a partial plan view of a sensor element mounted to an arm, in accordance with at least one embodiment.

Reference is now made to FIG. 9. Sensor assembly 112 may be coupled to an arm 192 (which may be a first, second, or third arm 120, 124, and 128 in the other figures) in any suitable fashion. For example, sensor assembly 112 may comprise a sensor mount 116 which is rigidly connected to both arm 192 and sensor 114, for rigidly connecting sensor 114 to arm 192, as shown. Sensor assembly 112 may be rigidly connected to arm 192 in any suitable fashion, such as by fasteners 196 (e.g. screws, bolts, nails, or rivets), magnets, straps, hook-and-loop fasteners (e.g. Velcro™), welds, adhesives, or by integrally forming sensor assembly 112 and arm 192. In some embodiments, sensor mount 116 may be integrally formed with arm 192.

Figure 10:
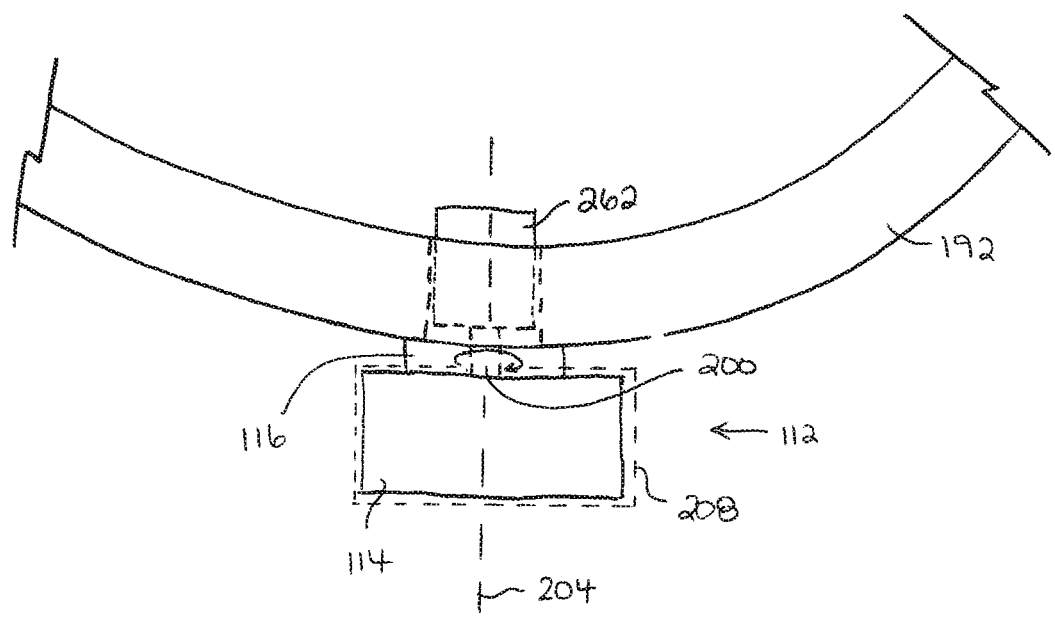
FIG. 10 is a partial plan view of a sensor element mounted to an arm, in accordance with at least one embodiment.

Turning to FIG. 10, sensor mount 116 may comprise a sensor mount connection 200 attached to or for attaching to a sensor 114, and which is movable with one or more degrees of freedom relative to sensor mount 116. Sensor mount connection 200 may be connected or connectable to sensor 114 in any fashion suitable for holding together sensor 114 and sensor mount connection 200 when operating the aerial sensor system, such as by fasteners (e.g. screws, bolts, nails, or rivets), magnets, straps, hook-and-loop fasteners (e.g. Velcro™), welds, adhesives, or by integrally forming sensor 114 with sensor mount connection 200 as shown. Sensor mount connection 200 may be movable (e.g. rotatable) relative to the sensor mount 116 about a mount axis 204. In the illustrated example, sensor mount connection 200 is rotatable with a connected sensor 114 relative to sensor mount 116 about a mount axis 204, which intersects sensor 114 (or sensor bounding box 208). This may permit sensor 114 to rotate about itself (e.g. reorient), in addition to moving (e.g. rotating) around the aerial vehicle. As used herein and in the claims, the "bounding box" of an element is the smallest imaginary box which completely encloses the element. In the context of intersection, an axis which extends through the opening of a donut-shaped element may not intersect the element, but would intersect that element's bounding box.

Figure 11:
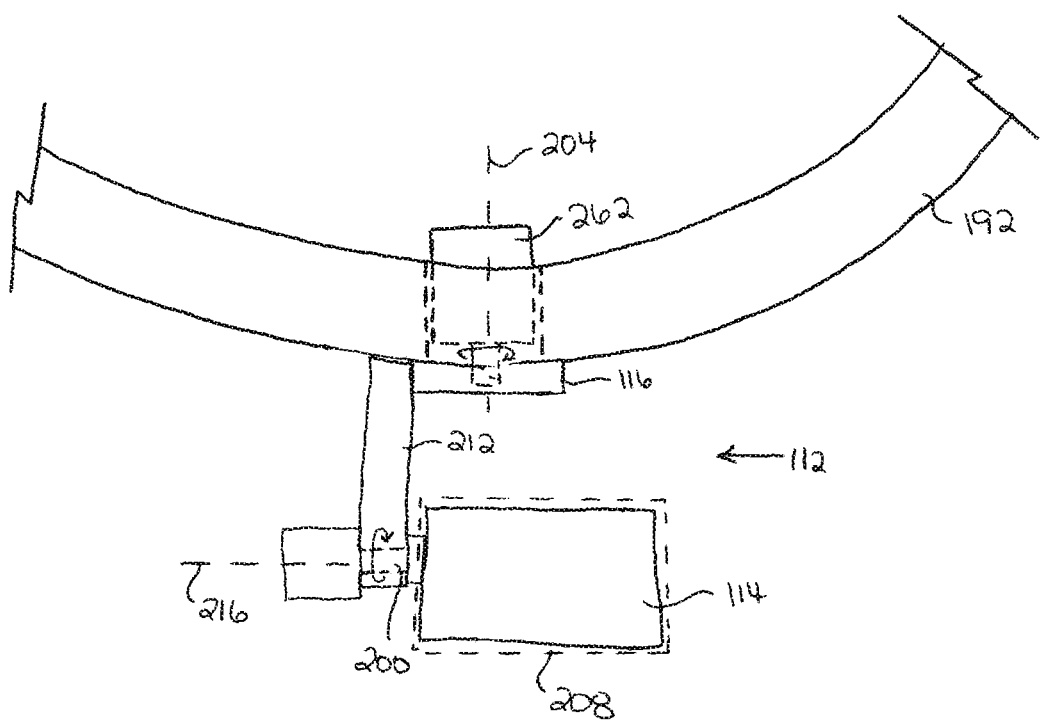
FIG. 11 is a partial plan view of a sensor element mounted to an arm, in accordance with at least one embodiment.

FIG. 11 shows another embodiment of sensor assembly 112 including a sensor mount 116 providing two degrees of rotation to the connected sensor 114. As exemplified, sensor mount 116 may include a sensor mount arm 212 rotatably coupled to arm 192 about a first mount axis 204, and a sensor mount connection 200 rotatably coupled to sensor mount arm 212 about a second mount axis 216 relative to sensor mount 116. This may provide sensor mount connection 200 and the connected sensor 114 with two degrees of freedom to rotate about first and second mount axes 204 and 216. As shown, each mount axis may intersect sensor 114 (or sensor bounding box 208). This may permit sensor 114 to rotate about itself (e.g. reorient), as opposed to moving or rotating around the aerial vehicle.

Figure 12:
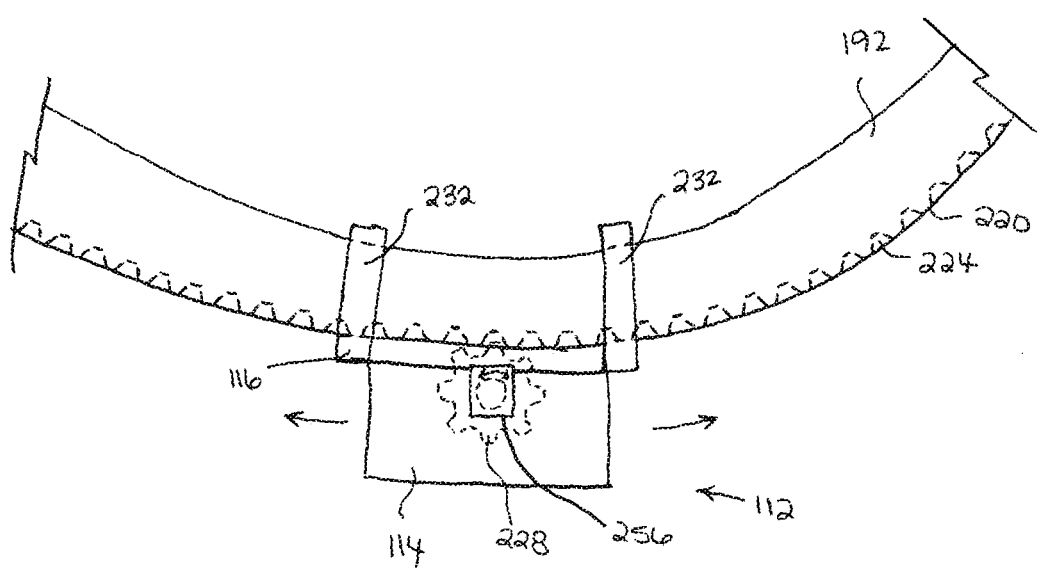
FIG. 12 is a partial plan view of a sensor element mounted to an arm, in accordance with at least one embodiment.

FIG. 12 shows another embodiment of sensor assembly 112 which is movably mounted to arm 192. This allows sensor 114 to move along arm 192. Sensor assembly 112 may be movably mounted to arm 192 in any manner that allows sensor 114 to be moved along arm 192. For example, sensor assembly 112, arm 192, or both may include one or more of gears, racks, wheels, belts, or rails. In the illustrated example, outer arm surface 220 includes a rack 224 (e.g. toothed track) and sensor assembly 112 includes a pinion 228 engaged with rack 224. Pinion 228 may be rotated to linearly drive sensor 114 along arm 192 around the aerial vehicle. Sensor assembly 112 may be connected to arm 192 in any manner that allows sensor 114 to move along arm 192. For example, sensor mount 116 may include one or more brackets 232 that slide along arm 192. Alternatively, or in addition, sensor assembly 112 and arm 192 may together include a wheel and rail design, similar to that used in roller coasters, whereby sensor assembly 112 can roll along arm 192.

Figure 13:
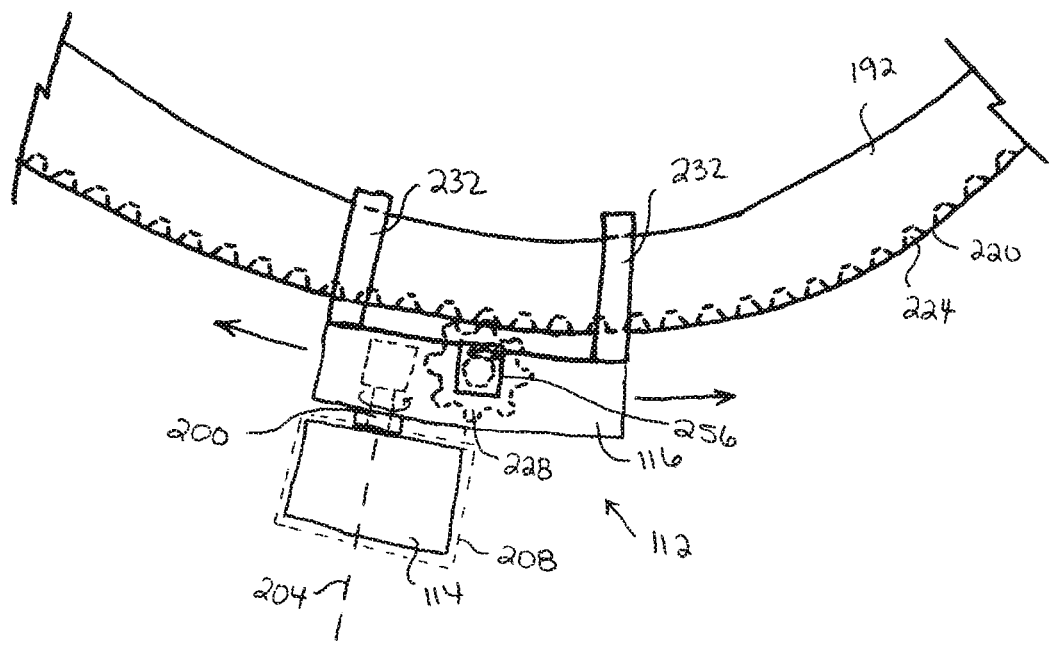
FIG. 13 is a partial plan view of a sensor element mounted to an arm, in accordance with at least one embodiment.

Referring to FIG. 13, in some embodiments, sensor assembly 112 may be both slidably coupled and rotatably coupled to arm 192. For example, sensor mount 116 may be slidably coupled to arm 192 similar to the embodiment of FIG. 12, and further comprise a sensor mount connection 200 that is rotatable (with the connector sensor 114) about one more mount axes. In the illustrated example, sensor mount connection 200 is rotatable about first mount axis 204. As shown, first mount axis 204 may intersect sensor bounding box 208.

Sensor mounting assembly 108 preferably provides sensor 114 with at least two degrees of freedom of movement around aerial vehicle 104. FIG. 1 shows an example where sensor 114 is movable around aerial vehicle 104 with at least three degrees of freedom. This allows sensor 114 to move to many positions surrounding aerial vehicle 104. Preferably, sensor mounting assembly 108 allows sensor assembly 112 to move (e.g. rotate) around at least two axes 132, 136, and/or 140 which do not intersect sensor assembly bounding box 210. Referring to FIG. 5, the axes 132, 136, and/or 140 may intersect the aerial vehicle 104 and/or the aerial vehicle bounding box 236. In some embodiments, the axes 132, 136, and/or 140 may intersect the aerial vehicle center of gravity 240.

Referring to FIGS. 3 and 5, in some embodiments, sensor mounting assembly 108 includes a plurality of arms 120, 124, and/or 128, which rotate around aerial vehicle to provide the connected sensor assembly 112 with at least two degrees of freedom of movement around aerial vehicle 104. Referring to FIG. 4, in other embodiments, sensor mounting assembly 108 may have just one arm 120, and sensor assembly 112 may be movably (e.g. slidably) mounted to the arm 120 (e.g. as described in reference to FIGS. 12 and 13) to provide an additional degree of freedom of movement around aerial vehicle 104. For example, the slidable coupling of sensor assembly 112 along arm 120 may permit the sensor assembly 112 to move around aerial vehicle 104 about a second axis.

With continuing reference to FIG. 1, sensor mounting assembly 108 may permit sensor assembly 112 to move (e.g. rotate) around each axis 132, 136, and 140 across any suitable angular range. For example, each rotary joint 144, 152, and 160 may permit sensor assembly 112 to rotate about the respective axis 132, 136, or 140, by at least 30 degrees, such as at least 60, at least 90, at least 120, at least 180, at least 300, 90 to 360, 90 to 180 degrees, or 360 degrees. The angular range may be the same for all axes 132, 136, and 140, or different for one or more (or all) of axes 132, 136, and 140.

Similarly, sensor assembly 112 may be movably mounted to an arm 120, 124, or 128, as described with reference to FIGS. 12 and 13, to permit sensor assembly to move around aerial vehicle 104 by at least 30 degrees, such as at least 60, at least 90, at least 120, at least 180, at least 300, 90 to 360, 90 to 180 degrees, or 360 degrees. For example, the rack, belt, or rails may extend across the entirety or only a sub-portion (e.g. less than the entirety) of the arm 120, 124, or 128.

Referring to FIG. 1, each axis 132, 136, and 140 may be oriented at any suitable angle to each other axis 132, 136, and 140. For example, one or more (or all) of axes 132, 136, and 140 may intersect, and one or more (or all) of axes 132, 136, and 140 may be non-intersecting. As shown, axes 132, 136, and 140 may be perpendicular to each other. In other embodiments, one or more (or all) of axes 132, 136, and 140 may be angled less than 90 degrees from the other axes.

Referring to FIG. 5, one or more (or all) of axes 132, 136, and 140 may intersect aerial vehicle 104 and/or aerial vehicle bounding box 236. In some embodiments, one or more (or all) of axes 132, 136, and 140 may not intersect aerial vehicle 104 and/or aerial vehicle bounding box 236.

Referring to FIGS. 3-5, sensor mounting assembly 108 may include one or more motors for driving sensor assembly 112 to rotate about one or more (or all) of axes 132, 136, and 140. For example, sensor mounting assembly 108 may include a first motor 244 coupled to first arm 120 to rotate first arm 120 about first axis 132, a second motor 248 coupled to second arm 124 (if present) to rotate second arm 124 about second axis 136, and a third motor 252 coupled to third arm 128 (if present) to rotate third arm 128 about third axis 140. Further, referring to FIGS. 12 and 13, in the case of a sensor assembly 112 movably mounted to an arm 192 for movement along the arm 192, the sensor mounting assembly 108 (e.g. sensor assembly 112) may include a fourth motor 256 (e.g. to drive pinion 228) for driving sensor assembly 112 to move along the arm 192 around the aerial vehicle.

Referring to FIGS. 3-5, 12, and 13, sensor mounting assembly 108 may include one or more (or all) of motors 244, 248, 252, and 256 according to whether sensor mounting assembly 108 includes one, two, or three arms 120, 124, or 128, and whether sensor assembly 112 is movable along an arm 120, 124, or 128. In some embodiments, sensor mounting assembly 108 may include suitable linkages to permit one motor to control the movement (e.g. rotation) about two or more axes 132, 136, and 140. Motors 244, 248, 252, and 256 may be selectively controlled (e.g. by control signals from a controller 260) (e.g. individually and optionally simultaneously) to manipulate the position of sensor assembly 112 around aerial vehicle 104.

Referring to FIGS. 10 and 11, sensor mounting assembly 108 (e.g. sensor assembly 112) may include one or more sensor mount motors 262 operable to rotate sensor mount connection 200 (and the connected sensor 114) around mount axes 204 and 216. Motors 262 may be selectively controlled (e.g. by control signals from controller 260) (e.g. individually and optionally simultaneously) to manipulate the orientation of sensor assembly 112.

Referring to FIGS. 5 and 12, in some embodiments, sensor mounting assembly 108 may include one or more brakes 264 for inhibiting or slowing movement (e.g. rotation) of sensor assembly 112 about one or more (or all) axes 132, 136, or 140, or for inhibiting or slowing movement of sensor 114 along one of arms 120, 124, and 128. For example, sensor mounting assembly 108 may include a brake $264_1$ coupled to first rotary joint 144 for slowing or inhibiting rotation about first axis 132, a second brake $264_2$ coupled to second rotary joint 152 for slowing or inhibiting rotation about second axis 136, a third brake $264_3$ coupled to third rotary joint 160 for slowing or inhibiting rotation about third axis 140, and/or a fourth brake $264_4$ coupled to sensor assembly 112 for slowing or inhibiting movement of sensor assembly 112 along arm 192. In alternative embodiments, sensor mounting assembly 108 may not have any brakes 264.

Referring to FIG. 1, aerial sensor system 100 may include any number of sensor assemblies 112. For example, aerial sensor system 100 may include 1-100 sensor assemblies 100, such as 1-10, 1-5, or at least 2 sensor assemblies 112. In the illustrated embodiment, aerial sensor system 100 includes one sensor assembly 112. FIG. 5 shows an example of aerial sensor system 100 including two sensor assemblies 112. Sensor assemblies 112 may be spaced apart (e.g. at opposite ends of sensor mounting assembly 108) as shown, or positioned close together.

Figure 14:
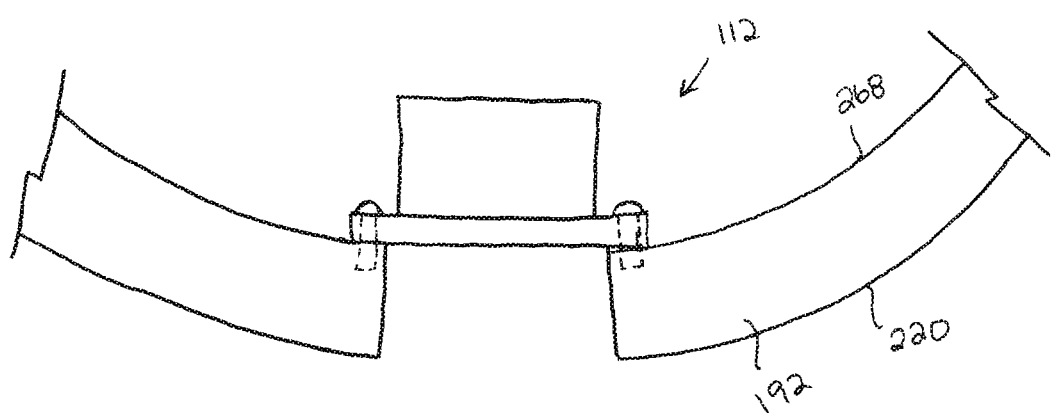
FIG. 14 is a partial plan view of a sensor element mounted to an arm, in accordance with at least one embodiment.
Figure 15:
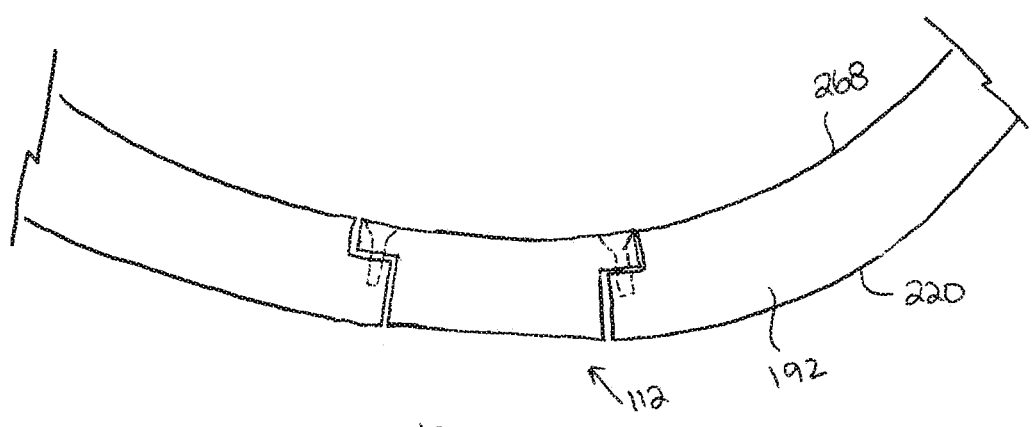
FIG. 15 is a partial plan view of a sensor element mounted to an arm, in accordance with at least one embodiment.

Referring to FIG. 9, sensor assembly 112 may be mounted to extend outwardly of outer arm surface 220, inwardly of inner arm surface 268, both, or neither. In the illustrated embodiment, sensor assembly 112 is fastened to outer arm surface 220 and extends outwardly of outer arm surface 220. This may permit sensor assembly 112 to be easily accessed, e.g. for adjustment, repairs, or replacement. FIG. 14 shows an example of sensor assembly 112 fastened to inner arm surface 268 and extending inwardly of inner arm surface 268. This may permit arm 192 to protect sensor assembly 112 from contact with objects outside of arm 192, which may damage or dirty sensor assembly 112. FIG. 15 shows an example of sensor assembly 112 fastened in position between inner and outer arm surfaces 268 and 220. This may provide a compact arrangement and prevent sensor assembly 112 from interfering with other moving parts (e.g. aerial vehicle, other arms) of the aerial sensor system.

Returning to FIG. 1, it will be appreciated that embodiments herein allow a sensor 114 (e.g. a camera) to be positioned at any spherical location around the aerial vehicle 104. For example, sensor 114 may be selectively moved above, below, left, right, forward, and rearward of aerial vehicle 104. This allows a sensor 114, such as a camera, to be pointed radially outwardly from the aerial vehicle 104 in all spherical directions unobstructed by the aerial vehicle 104 and the sensor mounting assembly 108.

It will be appreciated that sensor mounting assembly 108, according to any embodiment disclosed herein, may be provided separately (e.g. as a retrofit kit) to be connected to a suitable (e.g. appropriately sized) aerial vehicle 104. This may permit an existing aerial vehicle 104 to be enhanced with a sensor mounting assembly 108 that can position and orient a sensor 114 at any spherical position around the aerial vehicle 104.

Figure 16:
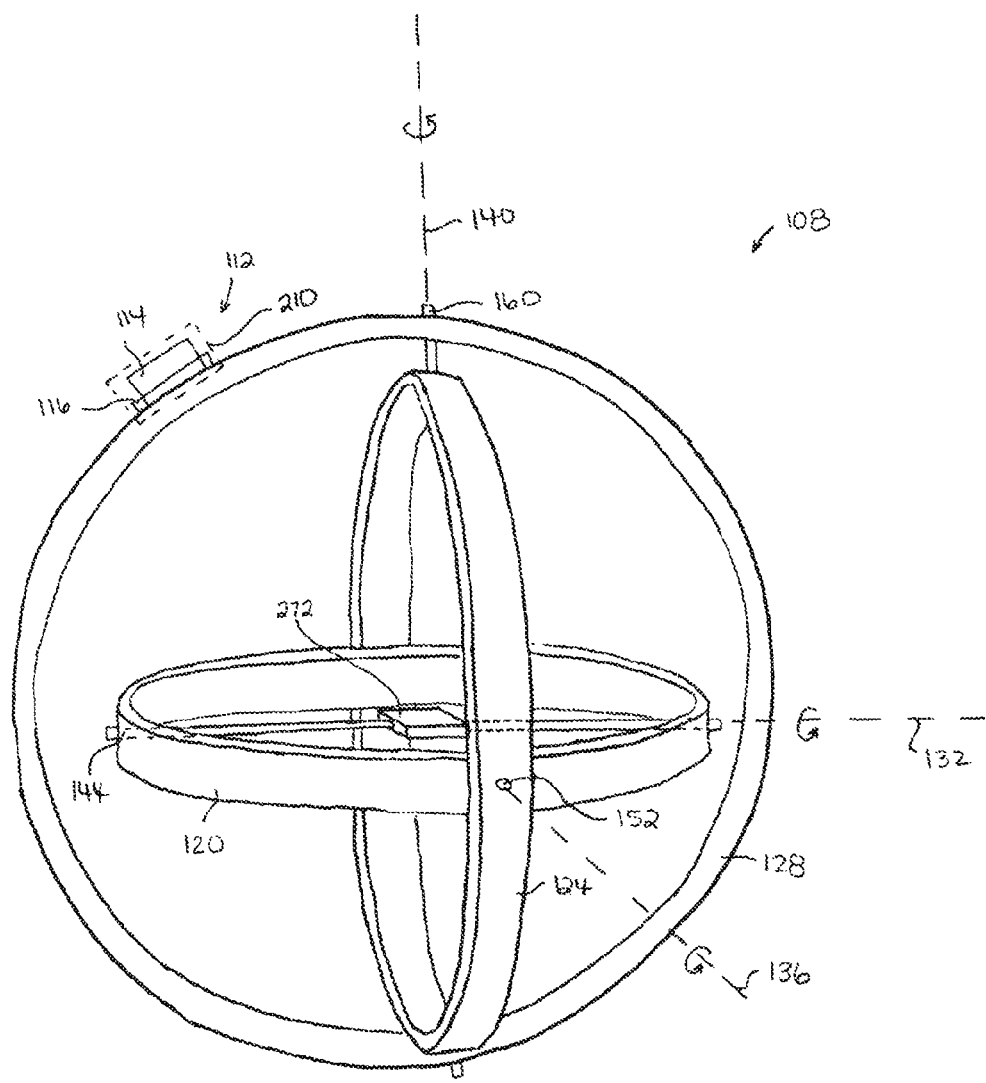
FIG. 16 is a partial plan view of a sensor element mounted to an arm, in accordance with at least one embodiment.
Figure 17:
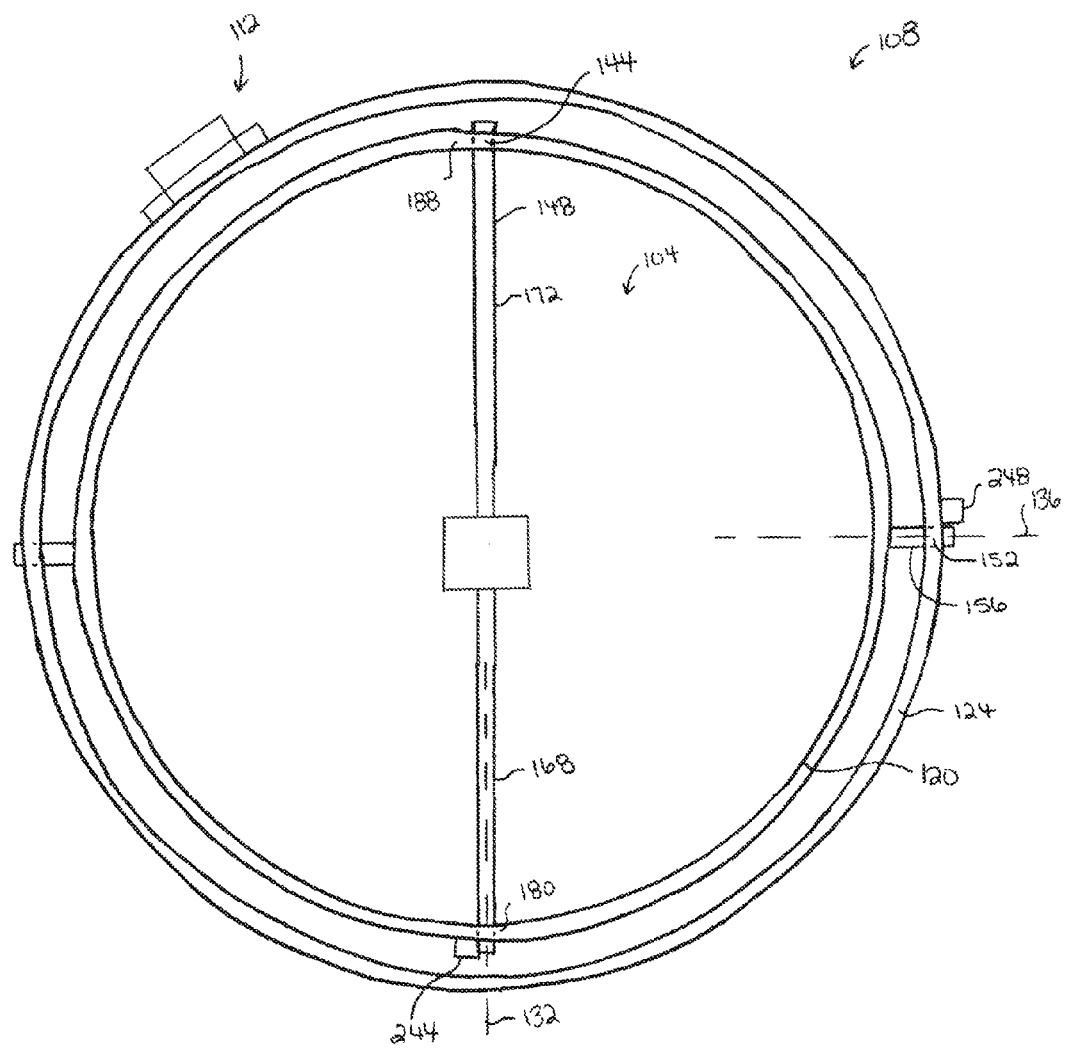
FIG. 17 is a partial plan view of a sensor element mounted to an arm, in accordance with at least one embodiment.
Figure 18:
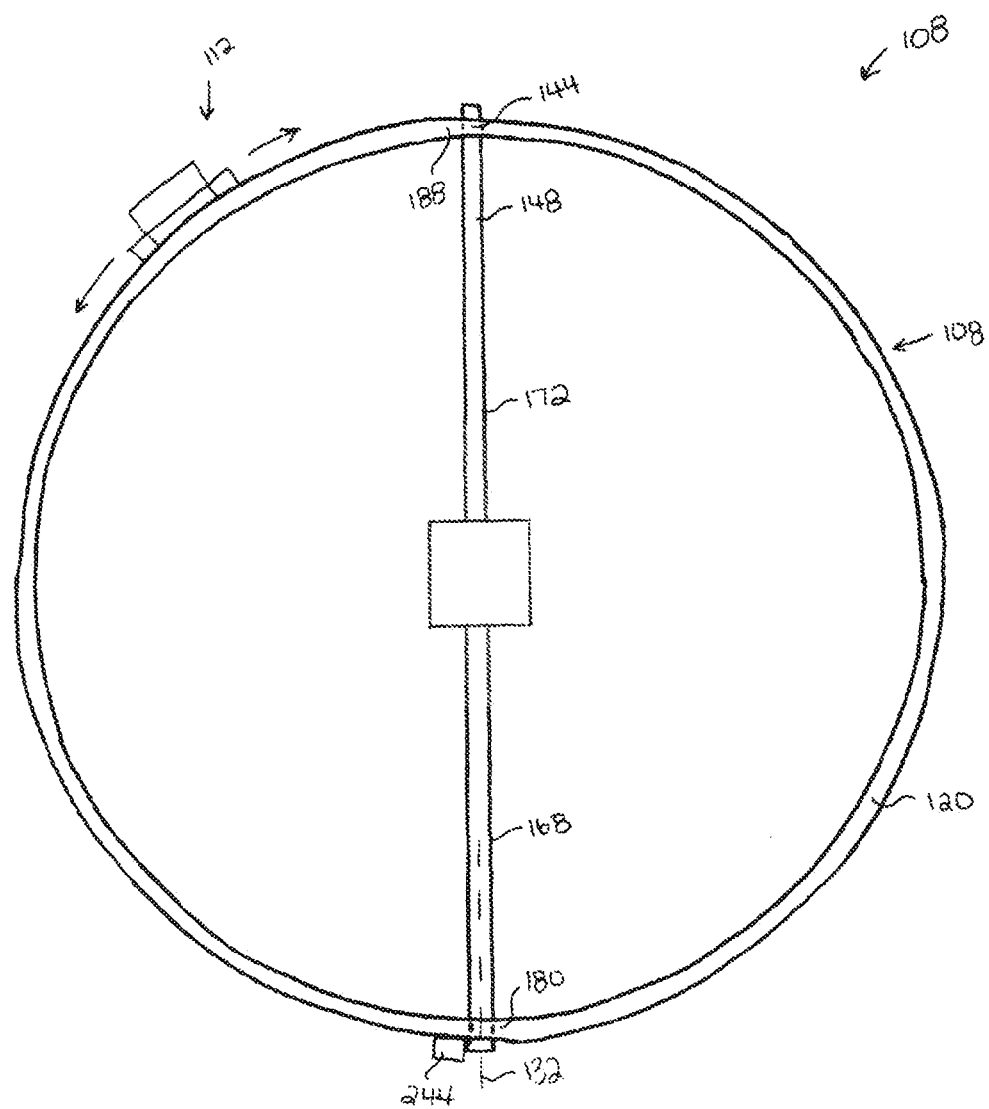
FIG. 18 is a partial plan view of a sensor element mounted to an arm, in accordance with at least one embodiment.

FIGS. 16-18 show an examples of sensor mounting assembly 108 of aerial sensor system 100 of FIGS. 1, 3, and 4 respectively, which is suitable for attachment to an existing multicopter. Sensor mounting assembly 108 may be connected to a multicopter in any manner that allows the sensor mounting assembly 108 as a whole to rotate about the first axis 132 relative to the connected multicopter. In the illustrated embodiment, sensor mounting assembly 108 includes a first axle 148 that is connected to first arm 120 by a first rotary joint 144 for rotation about first axis 132. As shown, a multicopter mounting bracket 272 may be secured to first axle 148 in any manner, such as by screws, bolts, weld, magnets, straps, or by integrally forming multicopter mounting bracket 272 and first axle 148. A multicopter may be rigidly fastened to multicopter mounting bracket 272 in any manner, such as by screws, bolts, welds, magnets, or straps. In some embodiments, multicopter mounting bracket 272 may accommodate a releasable connection to a multicopter so that the multicopter can be selectively disconnected from sensor mounting assembly 108 as desired.

In alternative embodiments, first axle 148 may be rigidly connected to first arm 120 in any manner, such as by screws, bolts, welds, or by integrally forming first axle 148 and first arm 120. In this case, multicopter mounting bracket 272 may be rotatably mounted to first axle 148 in any manner suitable for allowing the multicopter connected to mounting bracket 288 to rotate about first axis 132 relative to the sensor mounting assembly 108.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

ITEMS

Item 1: An aerial sensor system comprising:
  an aerial vehicle;
  a camera; and
  a sensor mounting assembly coupled to the aerial vehicle and to the camera, the sensor mounting assembly permitting the camera to be positioned radially outwardly from the aerial vehicle in all spherical positions.
Item 2: The aerial sensor system of item 1, wherein:
  the sensor mounting assembly permits the camera to be pointed radially outwardly from the aerial vehicle in all spherical directions unobstructed by the aerial vehicle and the sensor mounting assembly.
Item 3: The aerial sensor system of item 1, wherein:
  the sensor mounting assembly comprises at least a first arm coupled to the aerial vehicle and to the camera, and
  the first arm and the camera are rotatable together around the aerial vehicle.
Item 4: The aerial sensor system of item 3, wherein:
  the sensor mounting assembly comprises a second arm coupled to the aerial vehicle and to the camera, and
  the second arm and the camera are rotatable together around the aerial vehicle.
Item 5: The aerial sensor system of item 4, wherein:
  the first and second arms are rotatably coupled to the aerial vehicle in series, and
  the second arm and the camera are rotatable together around the aerial vehicle independently of the first arm.
Item 6: The aerial sensor system of item 3, wherein:
  the camera is movably mounted to the first arm and movable along the first arm.
Item 7: The aerial sensor system of item 3, wherein:
  the first arm is rotatable around the aerial vehicle with an angular range of at least 180 degrees.
Item 8: The aerial sensor system of item 3, wherein:
  the first arm at least partially surrounds the aerial vehicle.
Item 9: The aerial sensor system of item 4, wherein:
  each of the first and second arms at least partially surrounds the aerial vehicle.
Item 10: The aerial sensor system of item 3, wherein:
  the aerial vehicle has an aerial vehicle bounding box,
  the first arm is rotatable around the aerial vehicle about a first axis, and
  the first axis intersects the aerial vehicle bounding box.
Item 11: The aerial sensor system of item 10, wherein:
  the first axis is non-intersecting with the camera.
Item 12: The aerial sensor system of item 1, wherein:
  the camera is movable around the aerial vehicle with at least two degrees of freedom.
Item 13: The aerial sensor system of item 1, wherein:
  the camera is movable around the aerial vehicle about at least two axes.
Item 14: The aerial sensor system of item 13, wherein:
  the aerial vehicle has an aerial vehicle bounding box, and
  each of the two axes intersects the aerial vehicle bounding box.
Item 15: The aerial sensor system of item 14, wherein:
  each of the two axes is non-intersecting with the camera.
Item 16: The aerial sensor system of item 13, wherein:
  the two axes are perpendicular.
Item 17: The aerial sensor system of item 1, wherein:
  the aerial vehicle is a multicopter.
Item 18: The aerial sensor system of item 1, further comprising:
  at least one motor, the at least one motor is collectively operable to selectively move the camera around the aerial vehicle.
Item 19: The aerial sensor system of item 3, further comprising:
  at least one motor, the at least one motor collectively operable to rotate the first arm and the camera around the aerial vehicle.
Item 20: The aerial sensor system of item 3, further comprising:
  a sensor mount coupled to the first arm, the sensor mount having a sensor mount connection rotatable about a mount axis relative to the sensor mount, and the sensor mount connection coupled to the camera.

Item 21: The aerial sensor system of item 20, wherein:
the mount axis intersects the camera.
Item 22: The aerial sensor system of item 1, further comprising:
a second camera,
wherein the sensor mounting assembly is coupled to the second camera, the sensor mounting assembly permitting the second camera to be pointed radially outwardly from the aerial vehicle in all spherical directions unobstructed by the aerial vehicle and the sensor mounting assembly.
Item 23: An aerial sensor system comprising:
an aerial vehicle;
a first arm rotatably coupled to the aerial vehicle, wherein the first arm is rotatable around the aerial vehicle about a first axis;
a camera movably coupled to the first arm, wherein the camera is movable relative to the first arm around the aerial vehicle; and
one or more motors collectively coupled to the first arm and the sensor, wherein the one or more motors are collectively operable to selectively position the camera around the aerial vehicle.
Item 24: An aerial sensor system comprising:
an aerial vehicle mount connectable to an aerial vehicle;
a camera; and
a sensor mounting assembly coupled to the aerial vehicle mount and to the camera, the sensor mounting assembly permitting the camera to be positioned radially outwardly from an aerial vehicle connected to the aerial vehicle mount in all spherical positions.
Item 25: The aerial sensor system of item 24, wherein:
the sensor mounting assembly permits the camera to be positioned radially outwardly from the aerial vehicle mount in all spherical positions.

The invention claimed is:
1. An aerial sensor system comprising:
an aerial vehicle;
a camera; and
a sensor mounting assembly coupled to the aerial vehicle and to the camera, the sensor mounting assembly permitting the camera to be positioned radially outwardly from the aerial vehicle in all spherical positions;
wherein the sensor mounting assembly permits the camera to be pointed radially outwardly from the aerial vehicle in all spherical directions unobstructed by the aerial vehicle and the sensor mounting assembly.
2. The aerial sensor system of claim 1, wherein:
the sensor mounting assembly comprises at least a first arm coupled to the aerial vehicle and to the camera, and
the first arm and the camera are rotatable together around the aerial vehicle.
3. The aerial sensor system of claim 2, wherein:
the sensor mounting assembly comprises a second arm coupled to the aerial vehicle and to the camera, and
the second arm and the camera are rotatable together around the aerial vehicle.
4. The aerial sensor system of claim 3, wherein:
the first and second arms are rotatably coupled to the aerial vehicle in series, and
the second arm and the camera are rotatable together around the aerial vehicle independently of the first arm.
5. The aerial sensor system of claim 2, wherein:
the camera is movably mounted to the first arm and movable along the first arm.
6. The aerial sensor system of claim 2, wherein:
the first arm is rotatable around the aerial vehicle with an angular range of at least 180 degrees.
7. The aerial sensor system of claim 2, wherein:
the first arm at least partially surrounds the aerial vehicle.
8. The aerial sensor system of claim 3, wherein:
each of the first and second arms at least partially surrounds the aerial vehicle.
9. An aerial sensor system comprising:
an aerial vehicle;
a camera; and
a sensor mounting assembly coupled to the aerial vehicle and to the camera, the sensor mounting assembly permitting the camera to be positioned radially outwardly from the aerial vehicle in all spherical positions;
wherein:
the sensor mounting assembly comprises at least a first arm coupled to the aerial vehicle and to the camera, and
the first arm and the camera are rotatable together around the aerial vehicle
the aerial vehicle has an aerial vehicle bounding box,
the first arm is rotatable around the aerial vehicle about a first axis, and
the first axis intersects the aerial vehicle bounding box.
10. The aerial sensor system of claim 1, wherein:
the camera is movable around the aerial vehicle with at least two degrees of freedom.
11. The aerial sensor system of claim 1, wherein:
the camera is movable around the aerial vehicle about at least two axes.
12. An aerial sensor system comprising:
an aerial vehicle;
a camera; and
a sensor mounting assembly coupled to the aerial vehicle and to the camera, the sensor mounting assembly permitting the camera to be positioned radially outwardly from the aerial vehicle in all spherical positions;
wherein:
the camera is movable around the aerial vehicle about at least two axes;
the aerial vehicle has an aerial vehicle bounding box, and
each of the two axes intersects the aerial vehicle bounding box.
13. The aerial sensor system of claim 1, further comprising:
at least one motor, the at least one motor is collectively operable to selectively move the camera around the aerial vehicle.
14. The aerial sensor system of claim 2, further comprising:
at least one motor, the at least one motor collectively operable to rotate the first arm and the camera around the aerial vehicle.
15. The aerial sensor system of claim 2, further comprising:
a sensor mount coupled to the first arm, the sensor mount having a sensor mount connection rotatable about a mount axis relative to the sensor mount, and the sensor mount connection coupled to the camera.
16. An aerial sensor system comprising:
an aerial vehicle;
a camera;
a sensor mounting assembly coupled to the aerial vehicle and to the camera, the sensor mounting assembly permitting the camera to be positioned radially outwardly from the aerial vehicle in all spherical positions; and
a second camera,
wherein the sensor mounting assembly is coupled to the second camera, the sensor mounting assembly permitting the second camera to be pointed radially outwardly from the aerial vehicle in all spherical directions unobstructed by the aerial vehicle and the sensor mounting assembly.

* * * * *